US012573021B2

(12) United States Patent (10) Patent No.: US 12,573,021 B2
Pickerd et al. (45) Date of Patent: Mar. 10, 2026

(54) ULTRASONIC DEFECT DETECTION AND CLASSIFICATION SYSTEM USING MACHINE LEARNING

(71) Applicant: Sonix, Inc., Springfield, VA (US)

(72) Inventors: John J. Pickerd, Hillsboro, OR (US); Kevin Ryan, Silver Spring, MD (US)

(73) Assignee: Sonix, Inc., Springfield, VA (US)

( * ) Notice: Subject to any disclaimer, the term of this patent is extended or adjusted under 35 U.S.C. 154(b) by 415 days.

(21) Appl. No.: 18/124,362

(22) Filed: Mar. 21, 2023

(65) Prior Publication Data

US 2023/0306578 A1 Sep. 28, 2023

Related U.S. Application Data

(60) Provisional application No. 63/324,340, filed on Mar. 28, 2022.

(51) Int. Cl.
*G06T 7/00* (2017.01)
*G06V 10/74* (2022.01)
*G06V 10/764* (2022.01)
*G06V 10/771* (2022.01)
*G06V 10/82* (2022.01)

(52) U.S. Cl.
CPC .......... *G06T 7/0008* (2013.01); *G06V 10/761* (2022.01); *G06V 10/764* (2022.01); *G06V 10/771* (2022.01); *G06V 10/82* (2022.01); *G06T 2207/10132* (2013.01); *G06T 2207/30148* (2013.01)

(58) Field of Classification Search
None
See application file for complete search history.

(56) References Cited

U.S. PATENT DOCUMENTS

| | | | | |
|---|---|---|---|---|
| 9,898,811 B2 * | 2/2018 | He | | G06V 20/66 |
| 10,482,590 B2 * | 11/2019 | He | | G06F 18/214 |
| 10,650,508 B2 * | 5/2020 | Chang | | G06F 18/24143 |

(Continued)

FOREIGN PATENT DOCUMENTS

WO WO-2022156873 A1 * 7/2022 ......... G01N 29/4481

OTHER PUBLICATIONS

Ling et al., "Deep Siamese Semantic Segmentation Network for PCB Welding Defect Detection," IEEE Transactions on Instrumentation and Measurement, vol. 71, Feb. 25, 2022 (Year: 2022).*

*Primary Examiner* — Soo Shin
(74) *Attorney, Agent, or Firm* — Leveque IP Law, P.C; Andrew J. Harrington; Krista Y. Chan

(57) ABSTRACT

In an automated defect detection and classification system, one or more computing devices access scan data acquired in an ultrasonic scan of an object. A first input feature map, including a two-dimensional (2D) scan image, is built from the scan data and input to a first deep neural network to generate a first output feature map. A second input feature map, including an image of a defect-free object, is input to a second deep neural network, having the same structure and weight values as first deep neural network, to produce a second output feature map. The scanned object is determined to contain a defect when a distance between first and second output feature maps is large. In an alternative approach, the 2D scan image and one or more images of the defect-free object are input to different channels of neural network trained using color images.

20 Claims, 6 Drawing Sheets

(56)                    References Cited

U.S. PATENT DOCUMENTS

| | | | | |
|---|---|---|---|---|
| 10,937,141 | B2 * | 3/2021 | Song | G06T 7/0002 |
| 11,954,844 | B2 * | 4/2024 | Kong | G06T 7/001 |
| 2018/0017501 | A1 * | 1/2018 | Trenholm | G01R 31/308 |
| 2020/0286208 | A1 * | 9/2020 | Halupka | G06T 5/60 |
| 2021/0341436 | A1 * | 11/2021 | Perdios | G01S 7/52077 |
| 2023/0281527 | A1 * | 9/2023 | Cella | G06V 20/17 |
| | | | | 705/7.17 |
| 2025/0196265 | A1 * | 6/2025 | Han | B23K 26/342 |
| 2025/0209697 | A1 * | 6/2025 | Barve | G06T 7/11 |

* cited by examiner

ULTRASONIC DEFECT DETECTION AND CLASSIFICATION SYSTEM USING MACHINE LEARNING

RELATED APPLICATIONS

This application claims the benefit of provisional application Ser. No. 63/324,340 filed Mar. 28, 2022 and titled "Ultrasonic Defect Detection and Classification System using Machine Learning," the entire content of which is hereby incorporated by reference.

BACKGROUND

This disclosure relates to the environment of ultrasonic non-destructive testing (NDT). A mechanical positioning system can synchronously scan an ultrasonic transceiver transducer, and a receiver transducer on the opposite side of a device under test (DUT). NDT may be used, for example, for testing semiconductor wafers, which may contain multiple devices, and chip packages. The reflected signal back to the transceiver from the DUT is a TDR, time domain reflection, waveform, while the waveform collected from the second receiver is a TDT, time domain transmission, waveform. The time axis of both waveforms is directly proportional to distance along the Z-axis of a position space representing the DUT. The transducers are scanned along the position space defined by the X and Y axes of the DUT. The scanned waveforms are digitized by an acquisition system and an image builder block creates a defect image of the DUT based on the TDT/TDR scan data.

Traditionally, human operators are trained to observe the images and recognize defects in the wafer or the package. It requires a lot of experience and training to perform this task. Currently, there are algorithms that can automatically detect and classify some of the types of defects that must be identified. Sometimes these algorithms are not able to detect the defects as needed.

BRIEF DESCRIPTION OF THE DRAWINGS

The accompanying drawings provide visual representations which will be used to describe various representative embodiments more fully, and can be used by those skilled in the art to better understand the representative embodiments disclosed and their inherent advantages. In these drawings, like reference numerals identify corresponding or analogous elements.

DETAILED DESCRIPTION

Figures 1, 2:
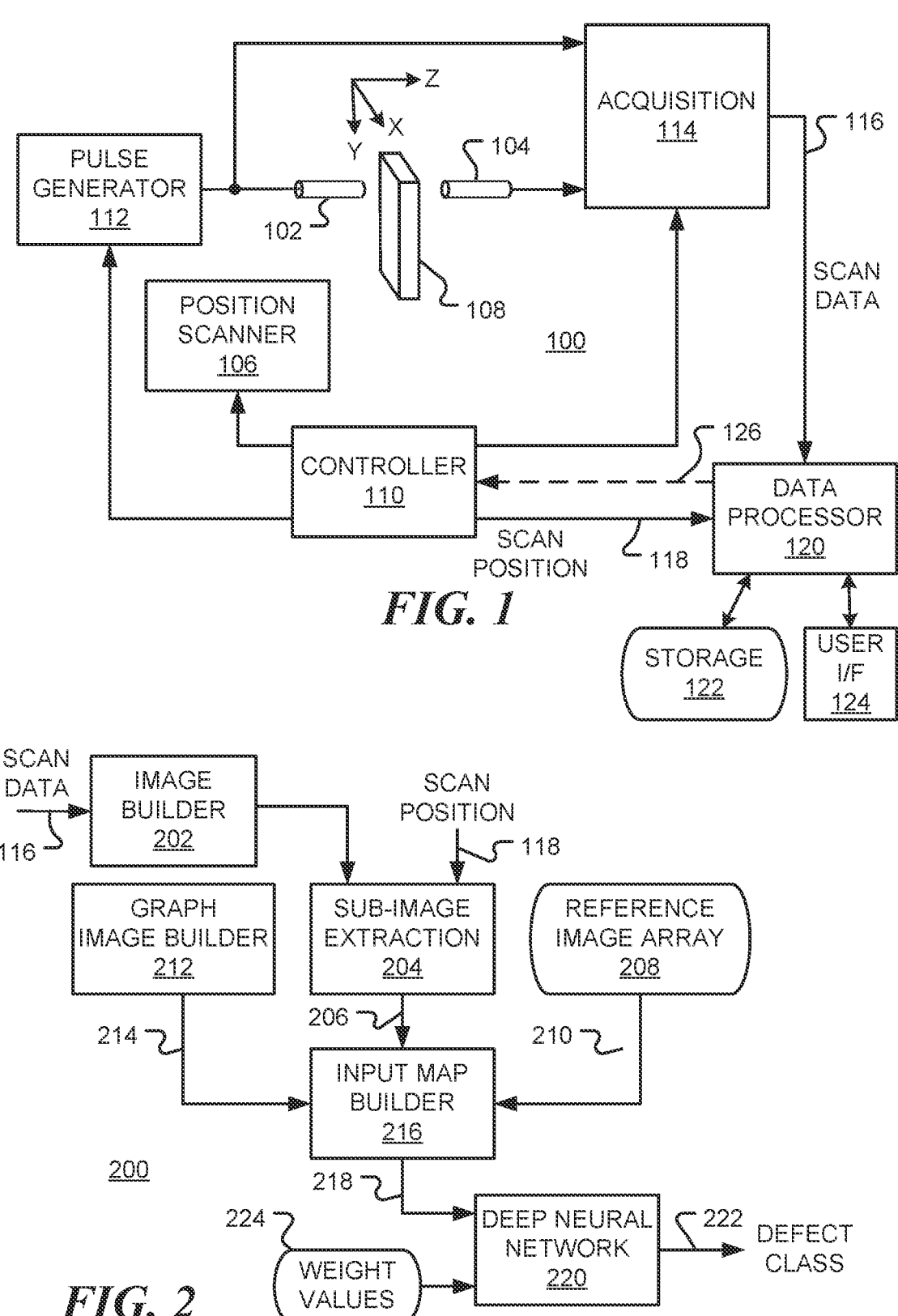
FIG. 1 is a block diagram of an ultrasonic scanner, in accordance with various representative embodiments.
FIG. 2 is a simplified block diagram of an apparatus for processing scan data from an ultrasonic scanner, in accordance with various representative embodiments.

The various apparatus and devices described herein provide mechanisms for automated detecting and classification of defects from a scanned ultrasonic image.

While this present disclosure is susceptible of embodiment in many different forms, there is shown in the drawings and will herein be described in detail specific embodiments, with the understanding that the embodiments shown and described herein should be considered as providing examples of the principles of the present disclosure and are not intended to limit the present disclosure to the specific embodiments shown and described. In the description below, like reference numerals are used to describe the same, similar or corresponding parts in the several views of the drawings. For simplicity and clarity of illustration, reference numerals may be repeated among the figures to indicate corresponding or analogous elements.

Embodiments of the disclosure generally employ deep neural networks to improve the ability to find defects and to classify them. A deep neural network, also referred to as a deep learning neural network, is a network that includes multiple processing layers. These layers may perform convolutions or cross-correlations between intermediate feature maps and relatively small weight kernels. In contrast, a final classification may be performed by an output layer of the network that is fully connected.

An aspect of some embodiments of the disclosure includes utilizing a novel approach to building a three-dimensional (3D) image tensor to use as input for the deep neural networks. 3D image tensors are commonly used in digital color images, where tensors have two spatial dimensions and a spectral dimension that includes Red, Green and Blue (RGB) spectral component of the color. The 3D tensor will sometimes be referred to here as an RGB image tensor, however, in general it is not limited to three spectral components (RGB) and any number of spectral components may be used. This novel RGB image representation also has an optional graph image encoding to input additional parameters into the deep network, to aid classification. For example, a good reference image with no flaws can be placed into the red (R) channel, a scanned image (maybe showing a defect) can be placed in the green (G) channel and other parameter data can be placed in the blue (B) channel as graphical images representing the parameter data.

Another novel aspect of some embodiments of the disclosure is to utilize a Siamese Neural Network, SNN, for the purpose of comparing the reference image to the DUT scanned image to make a pass/fail classification.

FIG. 1 is a block diagram of an ultrasonic scanner 100, in accordance with various representative embodiments. Ultrasonic scanner 100 includes ultrasonic transceiver 102 and ultrasonic receiver 104. Position scanner 106 provides positioning of transceiver 102 and receiver 104 with respect to an object being 108 to be scanned (also referred to as the device under test (DUT)).

Controller 110 sets up the system and synchronizes the physical scanning of ultrasonic transducers 102 and 104 over the area of the DUT 108. The scan may be performed in an X-Y plane parallel to a surface of the object. Controller 110 also synchronizes the other elements of the system, such as pulse generator 112 and acquisition unit 114. Acquisition system 114 converts signals received from the ultrasonic transducers during the scanning process to digital numbers and stores them into memory. As will be discussed below, controller 110 may also increment looping of the system through sub-images derived from the larger scanned image. In addition, controller 110 may control looping of multiple good reference images and the generation of 3D tensor images based on each sub image. Acquisition system 114 outputs digital scan data 116 and controller 110 outputs scan position data 118. Scan data 116 may include time domain transmission (TDT) waveforms and time domain reflection (TDR) waveforms that are used for the construction of scan images and reference images. Propagation time in these waveforms is directly proportional to Z axis distance in the XYZ waveform position data space.

Scan data 116 and scan position data 118 is passed to data processor 120 that is configured to detect and, optionally, classify defects in the object based on the scan data. Data processor 120 may use stored data, such as reference images, DUT characteristics and neural network weight values, stored in storage unit 122. User interface 124 may be used to display images and provide other user interaction. Data processor 120 may provide feedback to controller 110, as indicated by broken line arrow 126. Thus, data processor 120 may provide output to controller 110, storage 122 and/or user interface 124. Data processor 120 may be a general purpose programmed computer processor, a custom processor, or a combination thereof. Data processor 120 may include accelerator hardware for efficient processing of neural network computations.

FIG. 2 is a functional block diagram of an apparatus 200 for processing scan data from an ultrasonic scanner, in accordance with various representative embodiments. Apparatus 200 may include, for example, data processor 120 and storage 122 as shown in FIG. 1. The apparatus may be integrated with the scanner and used for automated detection and classification of devices during production. The apparatus may be implemented using one or more data processors and storage.

Image Builder 202 receives scan data 116 from an ultrasonic scanner and from it creates an image of the DUT. The scan data may include the digitized TDR/TDT waveform data. Various methods may be used, as will be apparent to those of skill in the art. For example, the TDT and/or TDT waveforms may be mapped directly into a hyper-spectral image format, with each color channel at a color plane representing one sample position of the waveform along the Z axis of the DUT position space or a range of positions of the waveform along the Z-axis. The resulting 3D image is not the normal image view a human would see, but rather a different vector space representation of the DUT. This approach can achieve a far higher resolution of defect representation along the Z axis. The hyper-spectral image may then be used as input to the deep neural networks.

Sub Image Extractor block 204 receives scan position data 118 from the controller of the ultrasonic scanner. This may be in the form of an index from the controller that specifies which part of the large image to extract a sub-image 206 from. For example, on a wafer with many replications of a circuit, the sub-image may only contain one circuit. However, in general, a sub-image may be all or part of the scanned image. In one embodiment, selection of sub-images is accomplished via a user interface and interaction from a user when the system is set up for training.

Reference image array 208 may contain a good reference image 210 for each sub-image position. That is, an image of a device known to be good (defect-free). Additional examples of a good reference image for each sub-image may also be kept. These may be acquired and stored as one of the first steps prior to training or running the system. Multiple reference images may be used with each sub-image to create multiple additional inputs for each sub-image to generate more training data.

Graph image builder block 212 is an optional block that may be used in some situations to provide other data as input into the deep neural network. For example, graph image builder block 212 may receive parameters such as temperature or version numbers of the parts, or any other parameter that may be used to help with the classification as needed. The input parameters are converted into graphs and then incorporated into an image. Multiple parameter graphs 214 may be placed in a single image. Sub-image 206, reference image 210 and parameters graphs 214 are combined in input map builder 216 to produce an input feature map 218 for deep neural network 220. Deep neural network 220 may be, for example, a computer-implemented neural network, and may include general purpose or custom processors, or a combination thereof.

In one embodiment, the input feature map is an RGB image tensor having red (R), green (G) and blue (B) channels. RGB image tensors are commonly used for storing color images, but in the present application the channels do not correspond to visible colors. There are many ways the parameters graphs 214 can be incorporated into the RGB channels of the image tensor. One approach would be to use one particular color channel, for example the blue (B) channel, for graph images only. However, when 3D cross-correlation filters are used, the reference image and defect image are correlated in the learning process. This causes interference between blue channel graph data and the other two channels. An alternate approach incorporates parameter graphs in the same image as the reference image and the defect image. The graphs may be placed outside the scanned image area so that cross-correlation filters between layers will not combine graph data with the image data.

Input map builder 216 places the raw DUT sub-image in one channel and one of the good reference images for that sub image in a second channel. Optionally, it places a second good image and/or a parameter graph image in a third channel. Calculation of the difference between the DUT sub-image and a good image is not required. It is noted that there may be multiple reference good images for each sub image position. Therefore, each sub image may have multiple RGB tensor images created for it to use as additional input examples for training the network. Parameter graph images may be incorporated outside of the DUT image and reference image boundaries within the overall image so that correlation filters do not overlap image data with graph data.

Optionally, the input feature maps may be stored for later analysis or for use as input when training the deep neural network.

An input feature map, such as an RGB image tensor, is input to deep neural network 220 to generate output 222 indicative of whether the DUT has a defect and, if so, the class of defect. Deep neural network 220 processes the input feature map using a set of weight values 224. Some of these weight values may be copied from another application, as will be described below. Alternatively, the weight values may be selected by a training process. Deep neural network 220 may be implemented in a serial manner using computational logic circuits, where an input feature map is combined with weight values read from computer-readable storage. Alternatively, the weight values may be realized as properties of the network itself, such as conductance values of resistive elements in an electrical circuit, for example.

Figure 3:
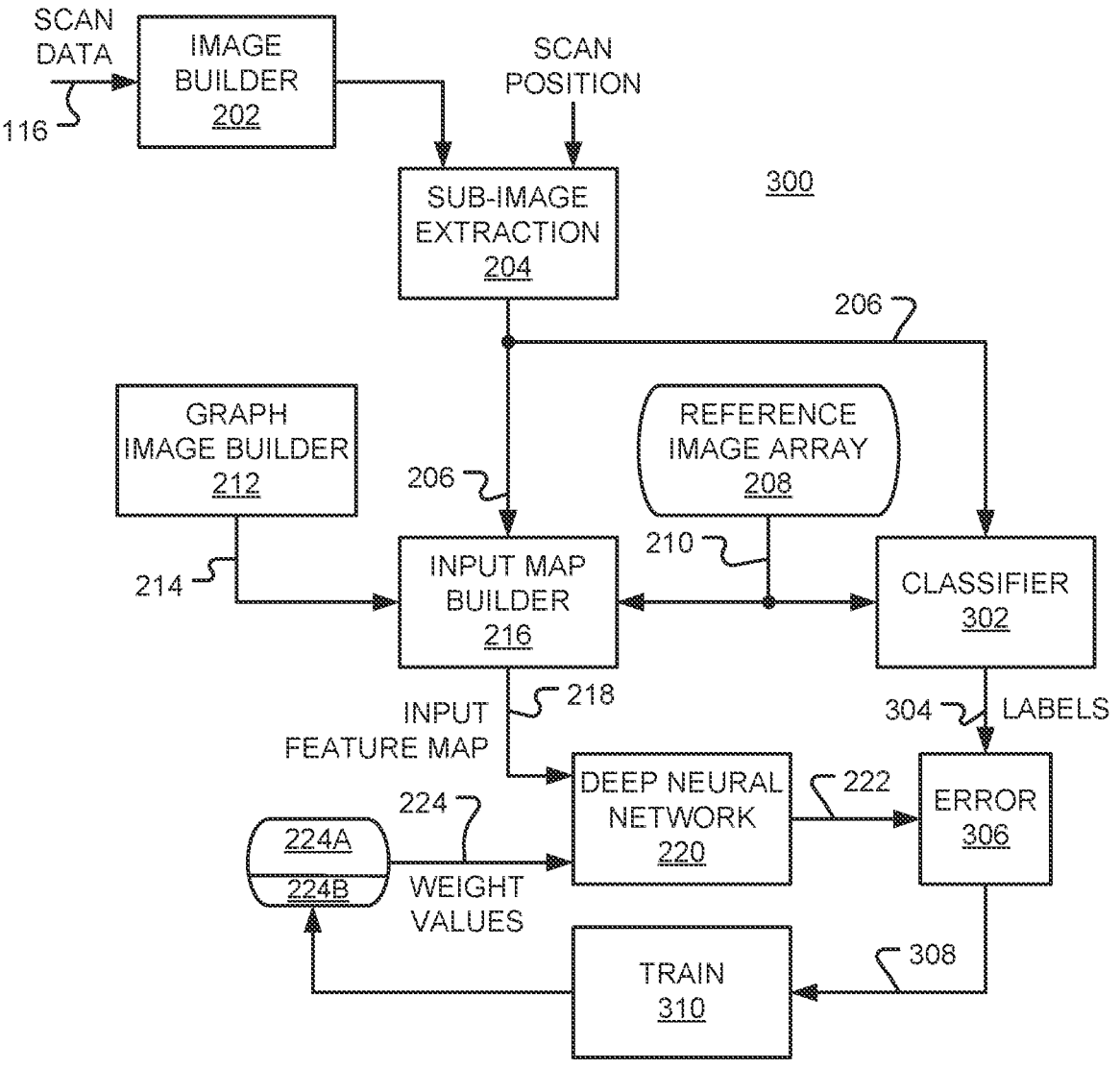
FIG. 3 is a simplified block diagram of an apparatus for training a neural network to process scan data from an ultrasonic scanner, in accordance with various representative embodiments.

FIG. 3 is a functional block diagram of an apparatus 300 for training a neural network to process scan data from an ultrasonic scanner, in accordance with various representative embodiments. As described above with reference to FIG. 2, an input feature map 218 is generated by input map builder 216 from reference image 210, scan image 206 and, optionally, parameter graph images 214. These images may be generated during a scan process or loaded from stored training data. The stored training data may be scanned images or synthetic images. Automated classifier 302 may be used to label any defects in images 206. Alternatively, or in addition, manual classification may also be used, where a user performs the classification of images to be used for training. However, the use of automated classification allows the training process to be more automated and reduces the amount of hand labeling that a user would have to perform to obtain the training data. Existing automated tools and foundation blocks may be used that allow the user to define the areas on their custom wafers and packages that need to be observed. The labels, together with any additional information about the scanned object or defect (such as defect position or extent) forms metadata 304. The inputs to classifier 302 are a DUT sub-image 206 and a reference sub-image 210. The output from classifier 302 is a set of metadata 304, which provides a pass/fail indication and, if fail, provides a classification of the flaw or defect. The classifier is usually only run during training of neural network 220. However, it may also run if the user needs to go back and inspect a failed part or collect additional data to periodically update the training of the network.

Metadata 304, which stores the output from the classification algorithms, may be stored in an array. Each index to this array of metadata structures is associated with a corresponding index to the corresponding RGB image tensor in the tensor array. Thus, each RGB image tensor corresponds with a DUT sub image which it contains. The RGB image tensors and associated metadata are provided as inputs to the deep neural network when it is being trained. After training, corresponding metadata may be output from the neural network when the network is used during runtime to classify defects.

Neural network 220 may include many layers to extract features of the input, followed by a fully connected layer for classification. In one embodiment, a "transfer learning" approach is used in which the network layers are pretrained using unrelated images. The layers of deep network 220 may use 3D cross-correlation filters across channels (e.g., three RGB channels) and within each channel plane. When transfer learning is used, the fully connected classification layer is replaced with a new untrained fully connected layer with the correct number of output classifications for this application. The network is then trained by receiving the tensor image array and the metadata array as input. During the training process, elements of output 222 are compared in error block 306 to corresponding elements in metadata 304. The resulting error 308 is used in training block 310 to update weight values 224 used by the network. A number of training algorithms are known to those of skill in the art. In one embodiment, all of the weight values are updated.

In another embodiment, the feature extracting layers (with weight values 224A) of a previously trained network are combined with output layers (with weight values 224B) that are structured to provide the desired classifications for a new application. For example, a network may include pre-trained feature extracting layers followed by a fully connected layer, a SoftMax layer and a classification layer. Training block 310 updates weight values 224B for the output layers while transfer learning is used for weight values 224A in the feature extracting layers. For example, normalization coefficients in a SoftMax layer may be trained to keep the network output between 0 and 1, and a classification layer may be trained to compute an entropy function used for classification. The number of pre-trained feature extracting layers may far exceed the number of layers being trained. Thus, transfer learning can greatly reduce the amount of training time and data needed.

Once the network is trained it may resume training periodically in the future as more data arrays are collected. Once a sufficient amount of additional data is ready, the network may pause runtime to update training with the new data. When the trained network is running, the metadata array is no longer input, and only the tensor image array is input. Then the network outputs the metadata set that is associated with the given unusual RGB tensor input image.

During run time, the existing classification algorithms block is not used because there is no metadata input to the deep network at runtime. However, if a part, e.g. a DUT, fails a defect scan, this classification block may be used to inspect the failed part further and classify using pre-existing methods.

Periodically during run time, more training data may be created if the user stops the system and inspects the parts further with classification algorithms. At some time, there may be enough new data available that an extended training of the network may be performed to incorporate the new data into the learning of the network.

While not shown in the block diagram of FIG. 3, in one embodiment, the system is programmed to create multiple output metadata sets at run time—one for each of multiple reference images associated with each sub image. The final classification set of metadata can then be chosen from the multiple sets based on which one is more probable to be correct according to histograms of the metadata values.

The system described above utilizes an RGB image structure as input to a single deep neural network using cross-correlation layers. This network utilizes cross-correlation layers, rather than convolution layers. While cross-correlation layers and convolution layers are equivalent for some kernels with specific symmetries, in general cross-correlation layers are not equivalent to convolution layers. The neural network may be trained using pre-existing data in which defects have been detected and classified. Alternatively, or in addition, the neural network may be trained in-situ. During in situ training of the neural network, the system scans many DUTs and runs them through existing automated detection and classification algorithms that label a given image as pass or fail and label any defect. Metadata may be generated that includes properties of the defect such as size, position, type, etc. Manual classification data examples may also be incorporated in addition to the automated classification used for training. For wafers or for packages, the initial high-resolution image shall be subdivided down into smaller images of suitable dimension to observe wafer sub circuits and be an acceptable size to use as input to the deep networks.

During training the network receives, as input, an array of RGB tensor images together with an array of metadata structures containing the class labels associated with each image.

After training, the system runtime consists of scanning a DUT and creating the image and the sub image RGB tensor and applying it as input to the deep network. The output of the network is the defect classification label(s) and, optionally, other identified properties of the defect such as size and position.

Many of the blocks described above are common to the various embodiments described below.

Figure 4:
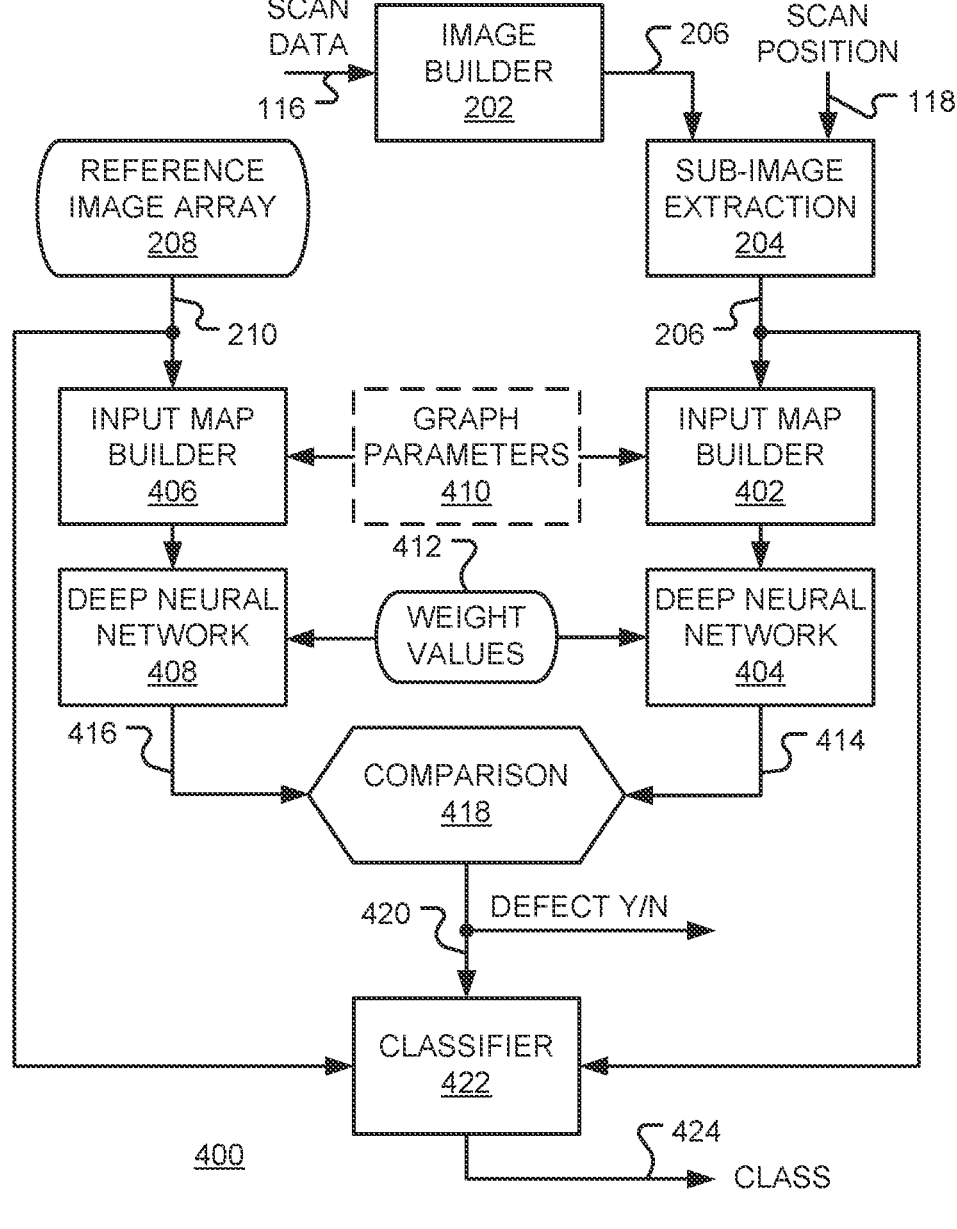
FIG. 4 is a block diagram of an ultrasonic defect detection and classification system, in accordance with further embodiments of the disclosure.

FIG. 4 is a block diagram of an ultrasonic defect detection and classification system 400 according to other embodiments of the disclosure. This system is similar to the system described above, except that the neural network includes a Siamese Neural Network (SNN). A Siamese Neural Network contains two identical deep networks that, after training, use the same weight values or coefficients. Referring to FIG. 4, a first input map builder 402 prepares image data for input to first deep neural network 404. Network 404 may be pre-trained using transfer learning, for example. The input feature map may be output from an RGB image tensor builder, for example, where a scanned DUT sub-image is placed into all three channels of RGB of the feature map. Second input feature map builder 406 prepares image data for input to second deep neural network 408. Builder 406 may build an RGB image tensor by placing one or more reference sub-images into the three RGB channels.

Deep neural networks 404 and 408 may be, for example, computer-implemented neural networks, and may include general purpose or custom processors, or a combination thereof.

In one embodiment, the RGB image for the DUT input side may contain the same DUT image in all three channels. However, an image generated from graph parameters 410 may be incorporated independently into one of the channels or within the image channel. In a further embodiment, each channel may contain a different acquisition of the reference image.

An important feature of the system in FIG. 4 is that the same weight values 412 are used by both the first and second deep neural networks. This ensures that the outputs from the networks are the same when the same input feature map is applied to both sides of the network.

In operation, output 414 from first deep neural network 404 and output 416 from second deep neural network 408 are compared in block 418 to produce pass/fail signal 420. When the outputs are similar, it is predicted that the scanned object is free from defects (i.e., passes inspection). When the outputs are dissimilar, it is predicted that the scanned object contains a defect (i.e., fails inspection).

Optionally, pass/fail signal 420 may be used to control operation of automated defect classifier 422, which produces a classification 424 of the defect based on a comparison of the scanned sub-image 206 and one or more reference images 210.

Thus, the Siamese Neural Network including first deep neural network 404, second deep neural network 408, and comparator 418, performs a pass/fail classification. This task is performed more proficiently than a standard network, because it is configured specifically for looking at the amount of similarity between two images. If the DUT fails, then the standard network shall be used to further classify the defect. The use of the standard network allows for optional graph input of additional parameters to help classify the defect.

Figure 5:
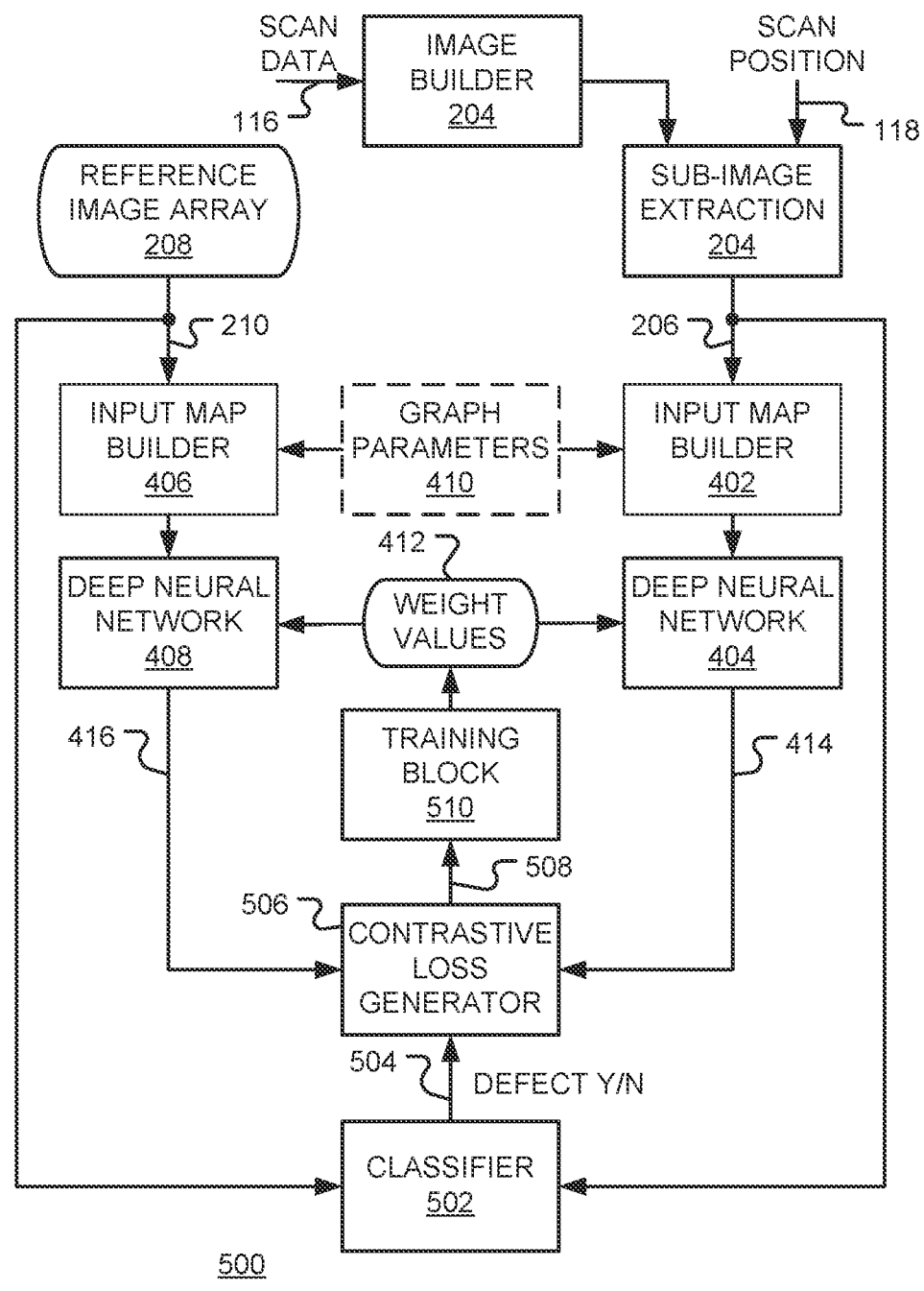
FIG. 5 is a simplified block diagram of an apparatus for training a Siamese Neural Network to detect defects in objects scanned in an ultrasonic scanner, in accordance with various representative embodiments.

FIG. 5 is a simplified block diagram of an apparatus 500 for training a Siamese Neural Network to detect defects in objects scanned in an ultrasonic scanner, in accordance with various representative embodiments. In the embodiment shown in FIG. 5, classifier 502 receives reference images 210 and scanned images 206 and determines whether the scanned image shows a defect, as indicated by signal 504. In an alternative embodiment, the scanned images may be labeled as showing a defect or not by other means—such as manual labeling, for example. In a still further embodiment, the scanned images may be synthetic images created to show a defect. Signal 504 is passed to contrastive loss generator 506. In one embodiment, the contrastive loss, L, is computed as $$L = Y \times D + (1-Y) \times \max(\text{margin} - D, 0),$$

where D is the Euclidean distance between neural network outputs 414 and 416 and Y takes the value 0 when scanned image 206 has no defect and the value 1 when it shows a defect.

The contrastive loss 508 is used by training block 510 to update the weight values 412 such that the contrastive loss is reduced. In one embodiment, initial weight values are obtained using transfer learning.

Figure 6:
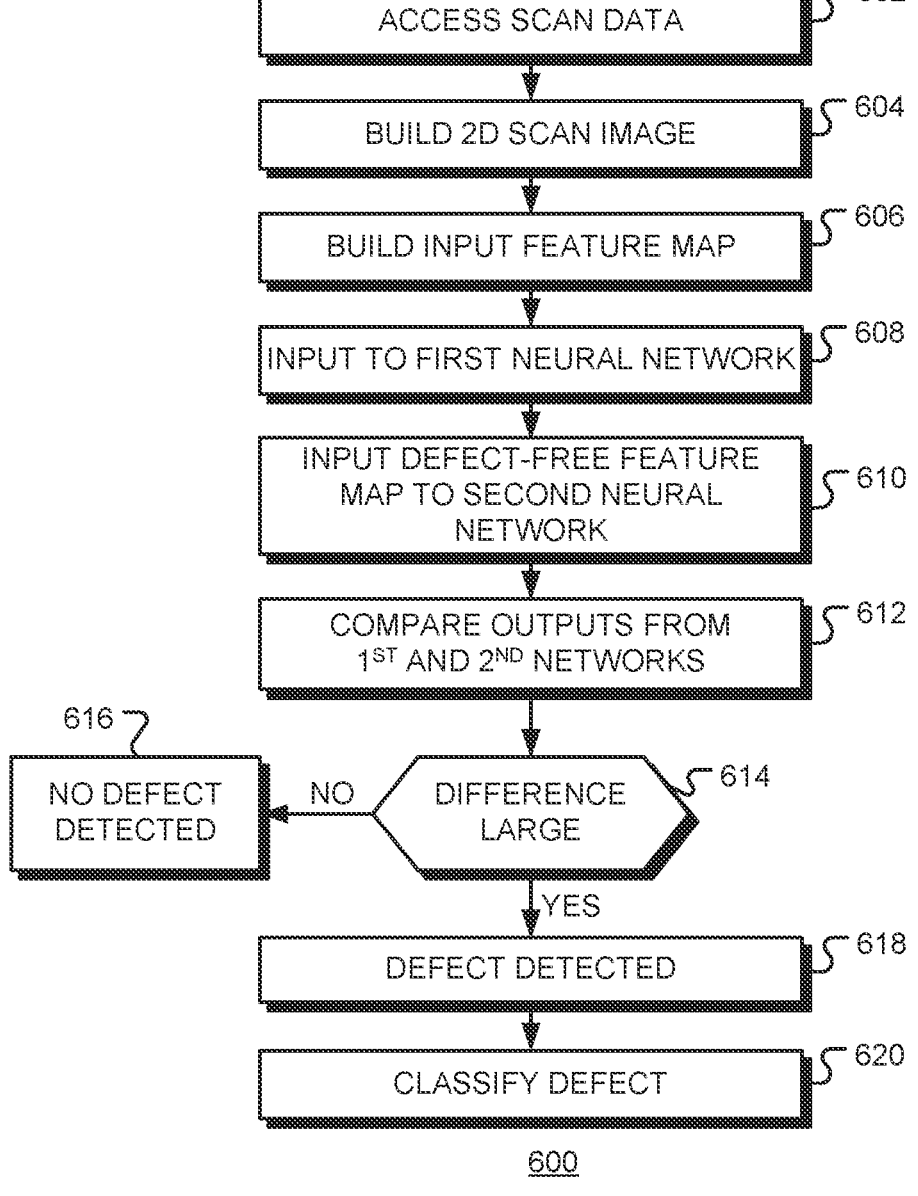
FIG. 6 is a flow chart of a computer-implemented method of defect detection and classification, in accordance with various representative embodiments.

FIG. 6 is a flow chart of computer-implemented method 600, in accordance with various representative embodiments. Referring to FIG. 6, at block 602 scan data acquired in an ultrasonic scan of an object is accessed at one or more computing devices. At block 604, a two-dimensional (2D) scan image is built from the scan data. Optionally, a first input feature map is built at block 606 from the 2D scan image. The first input feature map may include additional data such as parameter graphs, for example, or a 3D image tensor, as described above. The first input feature map is input to a first deep neural network at block 608 to generate a first output feature map. A second input feature map, containing one or more images of defect-free objects, is input to a second deep neural network at block 610 to produce a second output feature map. The second deep neural network has the same structure and weight values as the first deep neural network. The first and second output feature maps are compared at block 612. If a distance between them is not large (as compared to some threshold), as depicted by the negative branch from decision block 614, flow continues to block 616 and no defect is detected. The scanned object is determined to be free of defects. If the distance between the output feature maps is large, as depicted by the positive branch from decision block 614, a defect is detected as indicated by block 618. Optionally, the defect may be classified at block 620, either using an automated defect classifier or using manual classification by a user.

In one embodiment, the first input feature map is a three-dimensional (3D) image tensor having the 2D scan image in all three channels of the first 3D image tensor, and the second input feature map is a three-dimensional (3D) image tensor having a 2D scan image of a defect-free object in each of three channels. Each channel may contain a different image.

As described above, weight values of the first and second deep neural network may be copied from a deep neural network trained using color images. The weight values of the first and second deep neural network may be adjusted based on a contrastive loss of the distance between the output feature map of the first deep neural network and the output feature map of the second deep neural network.

Figure 7A:
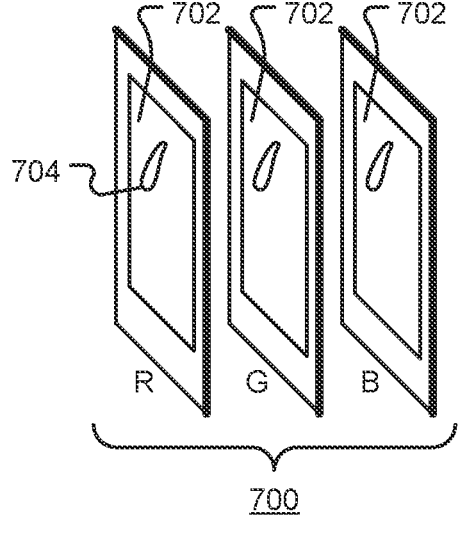
FIG. 7A-7C are diagrammatic representations of input feature maps, in accordance with various representative embodiments.

FIG. 7A is a diagrammatic representation of a first input feature map 700, in accordance with various representative embodiments. The feature map is a 3D image tensor having "R", "G" and "B" channels. This format is commonly used for storing red, green and blue channels of a color image. However, in FIG. 7A each channel is used to store 2D image of a scanned object. Thus, image 702 is placed in all three channels. In the example shown, a region 704 of the image shows a defect.

Figure 7B:
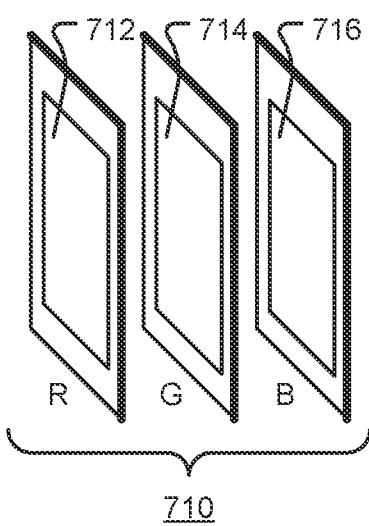

FIG. 7B is a diagrammatic representation of a second input feature map 710, in accordance with various representative embodiments. Again, the feature map is a 3D image tensor having "R", "G" and "B" channels. In FIG. 7B, each channel is used to store 2D image of a defect-free object. Thus, image 712 is placed in the "R" channel, image 714 is placed in the "G" channel, and image 716 is placed in the "B" channel.

Figure 7C:
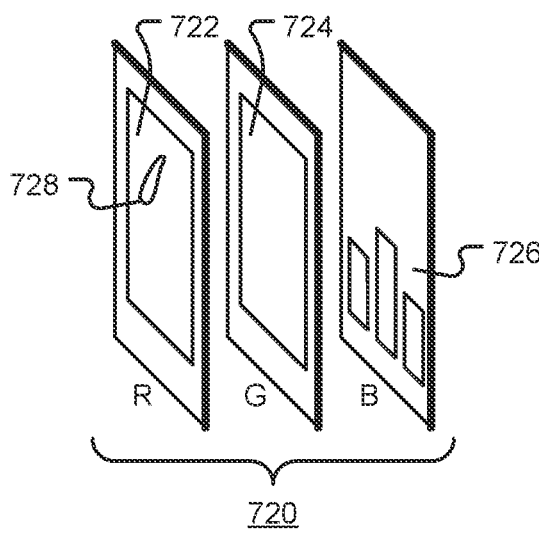

FIG. 7C is a diagrammatic representation of another input feature map 720, in accordance with various representative embodiments. Again, the feature map is a 3D image tensor having "R", "G" and "B" channels. In FIG. 7C, scanned image 722 is placed in the "R" channel, defect-free image 724 is placed in the "G" channel, and a parameter graph image 726 is placed in the "B" channel. In the example shown, region 728 of image 722 shows a defect. In other embodiments, graphical parameter data may be placed in the periphery of a channel, outside of the region occupied by the image.

An advantage of using 3D image tensors with three channels is that they can be input to high-performing neural networks that have been pretrained using RGB color image inputs. Resnet18 is one example of such a pretrained network, but embodiments of the disclosure are not limited to any specific pretrained network. The output layers of these pretrained networks are replaced and retrained for automated defect detection and classification. This is a big advantage, because training the network from scratch would require much greater number of input images. By using the pretrained feature extraction of the lower layers, and only training the replaced output layers, the networks can be trained with less data, and effort to provide a high performing network.

As described above, the three input channels of the 3D image tensor do not contain red, green and blue color components. Instead, an image without defects is put in one color channel, a scanned image (maybe with defects) is placed in another color channel and bar graphs of parameters in another color channel.

A further advantage of this approach is that the 3D tensor so constructed may still be viewed as a color image. For example, when a defect-free image is placed in the red channel and an image with a defect is placed in the green channel, the resulting color will depend on the differences between the images. Areas where the images are the same, the resultant image will have equal amounts of red and green (but with varying intensities), while areas where they are different either red or green will dominate. The expectation is that the neural network is sensitive to the color differences represented in the areas where defects occur. This approach may be used with Siamese neural networks to produce a pass/fail output and with other neural networks, such as a multi-layer residual network, to provide automated classification.

Embodiments of the disclosure use machine learning to assist in classification of ultrasonic scan images obtained for a DUT, device under test, such as wafers and packages. Embodiments may use deep networks that contain cross-correlation layers. Embodiments may also use a Siamese network for the purpose of comparing known good reference images to DUT images that may contain defects and then classify them as pass or fail. Training of the networks is performed using existing classification algorithms to minimize the amount of manual labeling by the user. Manual labeling may also be used as needed.

Aspects of the disclosure may operate on custom hardware, on firmware, digital signal processors, or on a specially programmed general-purpose computer including a processor operating according to programmed instructions. The terms controller or processor as used herein are intended to include microprocessors, microcomputers, Application Specific Integrated Circuits (ASICs), and dedicated hardware controllers. One or more aspects of the disclosure may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a non-transitory computer readable medium such as a hard disk, optical disk, removable storage media, solid state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGA, and the like. Particular data structures may be used to implement one or more aspects of the disclosure more effectively, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

Additionally, this written description makes reference to particular features. It is to be understood that the disclosure in this specification includes all possible combinations of those particular features. For example, where a particular feature is disclosed in the context of a particular aspect, that feature can also be used, to the extent possible, in the context of other aspects.

Also, when reference is made in this application to a method having two or more defined steps or operations, the defined steps or operations can be carried out in any order or simultaneously, unless the context excludes those possibilities.

Although specific aspects of the disclosure have been illustrated and described for purposes of illustration, it will be understood that various modifications may be made without departing from the spirit and scope of the disclosure. Accordingly, the disclosure should not be limited except as by the appended claims.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or," as used herein, is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive.

As used herein, the term "configured to," when applied to an element, means that the element may be designed or constructed to perform a designated function, or that is has the required structure to enable it to be reconfigured or adapted to perform that function.

Numerous details have been set forth to provide an understanding of the embodiments described herein. The embodiments may be practiced without these details. In other instances, well-known methods, procedures, and components have not been described in detail to avoid obscuring the embodiments described. The disclosure is not to be considered as limited to the scope of the embodiments described herein.

Those skilled in the art will recognize that the present disclosure has been described by means of examples. The present disclosure could be implemented using hardware component equivalents such as special purpose hardware and/or dedicated processors which are equivalents to the present disclosure as described and claimed. Similarly, dedicated processors and/or dedicated hard wired logic may be used to construct alternative equivalent embodiments of the present disclosure.

Various embodiments described herein are implemented using dedicated hardware, configurable hardware or programmed processors executing programming instructions that are broadly described in flow chart form that can be stored on any suitable electronic storage medium or transmitted over any suitable electronic communication medium. A combination of these elements may be used. Those skilled in the art will appreciate that the processes and mechanisms described above can be implemented in any number of variations without departing from the present disclosure. For example, the order of certain operations carried out can often be varied, additional operations can be added or operations can be deleted without departing from the present disclosure. Such variations are contemplated and considered equivalent.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A computer-implemented method comprising:
accessing, at one or more computing devices, scan data acquired in an ultrasonic scan of an object;
building, from the scan data, a first input feature map including a two-dimensional (2D) scan image;
training a Siamese neural network with scan data and scan position data corresponding to the scan data of the ultrasonic scan, wherein the Siamese neural network comprises a first deep neural network and a second deep neural network, wherein both the first deep neural network and the second deep neural network have a same structure and same weight values;
inputting the first input feature map to the first deep neural network of the Siamese neural network to generate a first output feature map;
inputting a second input feature map, including a scan image of a defect free object, to the second deep neural network of the Siamese neural network to produce a second output feature map; and
determining the object to contain a defect when a distance between the first and second output feature maps is greater than a predetermined distance threshold.

2. The computer-implemented method of claim 1, where:
building the first input feature map includes building a first three-dimensional (3D) image tensor having the 2D scan image in all three channels of the first 3D image tensor; and
building the second input feature map includes building a second 3D image tensor having:
a first 2D scan image of a defect-free object in a first channel of the second 3D image tensor;
a second 2D scan image of a defect-free object in a second channel of the second 3D image tensor; and
a third 2D scan image of a defect-free object in a third channel of the second 3D image tensor.

3. The computer-implemented method of claim 1, further comprising:
copying weight values of the first and second deep neural network from a deep neural network trained using color images.

4. The computer-implemented method of claim 1, further comprising adjusting the weight values of the first and second deep neural network based on a contrastive loss of the distance between the output of the first deep neural network and the output of the second deep neural network.

5. The computer-implemented method of claim 1, further comprising:
   passing the scan image to an automated defect classifier when the scanned object is determined to contain a defect.

6. The computer-implemented method of claim 1, wherein the scan data includes digitized time domain transmission (TDT) and time domain reflection (TDR) waveform data.

7. The computer-implemented method of claim 1, wherein the object is a semiconductor wafer.

8. A computer-implemented method comprising:
   accessing, at one or more computing devices, scan data acquired in an ultrasonic scan of an object;
   building, from the scan data, a two-dimensional (2D) scan image;
   generating a 2D graphical representation of information associated with the scan image;
   generating defect classification metadata for the object;
   building a three-dimensional (3D) image tensor having the 2D scan image in a first channel of the 3D image tensor, a 2D image of a defect-free object in a second channel of the 3D image tensor, and the 2D graphical representation of information in a third channel of the 3D image tensor;
   training a deep neural network with scan data and scan position data corresponding to the scan data of the ultrasonic scan;
   inputting the 3D image tensor to the deep neural network;
   comparing an output of the deep neural network to the defect classification metadata;
   adjusting weight values of an output layer of the deep neural network to provide a more closer match between the output of the deep neural network and the defect classification metadata; and
   storing the adjusted weight values.

9. The computer-implemented method of claim 8, further comprising copying weight values in feature mapping layers of the deep neural network from a deep neural network trained using color images.

10. The computer-implemented method of claim 8, further comprising storing a training data set including:
   storing the defect classification metadata for the object to the training data set; and
   storing the three-dimensional (3D) image tensor to the training data set.

11. The computer-implemented method of claim 8, wherein the scan data includes digitized time domain transmission (TDT) and time domain reflection (TDR) waveform data.

12. An automated defect detection system comprising:
   an input preprocessor configured to map data acquired in an ultrasonic scan of an object to a first input feature map;
   a Siamese neural network comprising:
      a first computer-implemented neural network configured to produce a first output feature map by applying a first set of weight values to the first input feature map; and
      a second computer-implemented neural network configured to produce a second output feature map by applying the first set of weight values to a second input feature map, where the second input feature map is mapped from one or more reference ultrasonic scans;
   wherein both the first computer-implemented neural network and the second computer-implemented neural network have a same structure and same weight values, and wherein the Siamese neural network is trained on scan data and scan position data corresponding to the scan data of the ultrasonic scan;
   a comparator, configured to generate a similarity measure based on a difference between the first output feature map and the second output feature map; and
   decision logic configured to determine, based on the similarity measure, whether the object contains a defect.

13. The automated defect detection system of claim 12, further comprising a memory storing reference ultrasonic scans, where the reference ultrasonic scans are scans of defect-free objects.

14. The automated defect detection system of claim 12, where the input preprocessor is configured to:
   build a two-dimensional (2D) scan image from scan data acquired in an ultrasonic scan of the object; and
   build, as the first input feature map, a first three-dimensional (3D) image tensor having the 2D scan image in all three channels of the first 3D image tensor.

15. The automated defect detection system of claim 14, where the second input feature map is a second 3D image tensor having:
   a first 2D reference ultrasonic scan image in a first channel of the second 3D image tensor;
   a second 2D reference ultrasonic scan image in a second channel of the second 3D image tensor; and
   a third 2D reference ultrasonic scan image in a third channel of the second 3D image tensor.

16. The automated defect detection system of claim 14, where the input preprocessor is configured to:
   build a 2D scan image from scan data acquired in an ultrasonic scan of the object;
   generate a 2D graphical representation of information associated with the scan image;
   and add the 2D graphical representation to the periphery of the 2D scan image to provide the first input feature map.

17. The automated defect detection system of claim 12, further comprising:
   an automated classification system configured to process the scan image when the decision logic determines the scanned object contains a defect to provide a classification of the defect.

18. The automated defect detection system of claim 12, configured to:
   access metadata indicating whether the object contains a defect;
   generate a contrastive loss based on a Euclidean distance between the first output feature map and the second output feature map and the accessed metadata; and
   update the first weight values based, at least in part, on contrastive loss function.

19. The automated defect detection system of claim 12, where the first computer-implemented neural network includes a deep neural network having a plurality of cross-correlation layers.

20. The automated defect detection system of claim 12, wherein the scan data includes digitized time domain transmission (TDT) and time domain reflection (TDR) waveform data.

* * * * *